(12) United States Patent
Osborne et al.

(10) Patent No.: US 6,460,585 B1
(45) Date of Patent: Oct. 8, 2002

(54) TIRE WITH TREAD COMPOUND CONTACTING BELT CORDS

(75) Inventors: Daniel G. Osborne, Greer; James Anderson, Simpsonville; Tim Vance, Greenville, all of SC (US); Bernad Thevand, Riom; Pedro Costa Pereira, Clermont-Ferrand, both of (FR)

(73) Assignee: Michelin Recherche et Techniques, S.A., Granges-Paccot (CH)

( * ) Notice: Subject to any disclaimer, the term of this patent is extended or adjusted under 35 U.S.C. 154(b) by 0 days.

(21) Appl. No.: 09/459,965

(22) Filed: Dec. 13, 1999

Related U.S. Application Data

(63) Continuation-in-part of application No. PCT/US98/20712, filed on Oct. 2, 1998.

(51) Int. Cl.⁷ .............................. B60C 9/18; B60C 9/20; B60C 9/22; B60C 15/00; B60C 15/06
(52) U.S. Cl. ................................ 152/209.1; 152/209.5; 152/526; 152/531; 152/532; 152/537; 152/539; 152/550
(58) Field of Search ............................ 152/209.1, 209.5, 152/526, 531, 532, 537, 539, 550

(56) References Cited

U.S. PATENT DOCUMENTS

| | | |
|---|---|---|
| 1,400,269 A | 12/1921 | Darrow |
| 2,541,506 A | 2/1951 | Cuthbertson et al. |
| 3,018,810 A | 1/1962 | Barassi |
| 3,130,769 A | 4/1964 | Hinden et al. |
| 3,392,774 A | 7/1968 | Le Bosse |
| 3,503,432 A | 3/1970 | Maiocchi |
| 3,516,465 A | 6/1970 | Guyot |
| 3,607,497 A | 9/1971 | Chrobak |
| 3,850,219 A | 11/1974 | Snyder |
| 3,991,803 A | 11/1976 | Praszek |
| 4,096,900 A | 6/1978 | Olsen |
| 4,137,112 A | 1/1979 | Hedlund |
| 4,196,764 A | 4/1980 | Skidmore |
| 4,287,930 A | 9/1981 | McIntosh et al. |
| 4,302,265 A | 11/1981 | Cesar et al. |
| 4,396,052 A | 8/1983 | Ahagon et al. |
| 4,407,346 A | * 10/1983 | Bandel et al. ............ 152/209.5 |
| 4,528,052 A | 7/1985 | Yoshie et al. |
| 4,795,523 A | 1/1989 | Laurent et al. |
| 4,801,344 A | 1/1989 | Laurent et al. |

(List continued on next page.)

FOREIGN PATENT DOCUMENTS

| | | |
|---|---|---|
| DE | 1039382 | 9/1958 |
| EP | 0243851 | 11/1987 |
| EP | 0264600 | 4/1988 |
| EP | 0620129 | 10/1994 |
| EP | 0705717 | 4/1996 |
| JP | 06071781 A | * 3/1994 ................. 152/537 |

OTHER PUBLICATIONS

Patent Abstracts of Japan, vol. 013, No. 425 (M–873), Sep. 21, 1989 of JP 01 160 704 of Jun. 23, 1989, Honda Motor Co. Ltd.
Patent Abstracts of Japan, vol. 1998, No. 14, Dec. 31, 1998 of JP 10 250 312 of Sep. 22, 1998, The Yokohama Rubber Co. Ltd.
Patent Abstracts of Japan, vol. 018, No. 317 (M–1622), Jun. 16, 1994 of JP 06 071 781 of Mar. 15, 1994, Bridgestone Corp.
"Mechanics of Pneumatic Tires", U.S. Department of Transportation (Clark, ed.) (Aug. 1981), p. 880.
"Mechanics of Pneumatic Tires", U.S. Department of Transportation (Clark, ed.) (Aug. 1981), p. 875.

*Primary Examiner*—Adrienne C. Johnstone
(74) *Attorney, Agent, or Firm*—Baker Botts L.L.P.

(57) ABSTRACT

A tire comprising a tread at least one radially outermost reinforcing layer of belt reinforcing textile cords arranged substantially at a zero angle with respect to the mid circumferential center plane perpendicular to the axis of the tire, a carcass a tread compound which is in direct contact with the radially outward side of the cords.

28 Claims, 3 Drawing Sheets

U.S. PATENT DOCUMENTS

| | | |
|---|---|---|
| 4,804,436 A | 2/1989 | Debroche et al. |
| 4,869,307 A | 9/1989 | Bormann et al. |
| 4,877,073 A | 10/1989 | Thise et al. |
| 4,895,692 A | 1/1990 | Laurent et al. |
| 4,963,207 A | 10/1990 | Laurent |
| 5,115,853 A | 5/1992 | Oare et al. |
| 5,134,024 A | 7/1992 | Carrier |
| 5,171,394 A | 12/1992 | Laurent |
| 5,185,051 A | 2/1993 | Laurent et al. |
| 5,221,406 A | 6/1993 | Laurent |
| 5,261,795 A | 11/1993 | Laurent et al. |
| 5,639,326 A | 6/1997 | Soulalioux |
| 5,660,656 A | 8/1997 | Herbelleauu et al. |
| 6,199,612 B1 | 3/2001 | Costa Pereira et al. |

* cited by examiner

TIRE WITH TREAD COMPOUND CONTACTING BELT CORDS

CROSS REFERENCE TO RELATED APPLICATIONS

This is a continuation-in-part of prior copending international application Ser. No. PCT/US98/20712 filed Oct. 2, 1998.

BACKGROUND OF THE INVENTION

The invention relates to tires and more specifically to the architecture of the tread portion of the tires.

The tread portion of tires usually comprises a tread, a belt reinforcing element comprising at least one and usually more than one layer of reinforcing cords, and a carcass. The tread portion comes in contact with the ground and needs to transmit the forces responsible for the handling of the vehicle. In this respect, it is necessary for the tread portion to be relatively rigid, while sufficiently flexible to achieve a good flattening when the tread comes in contact with the road.

To achieve a very good compromise between all the desired performances, it has become common, especially for performance tires for passenger cars, to have more and more different compounds designed for a specific role in a specific location in a tire. For instance, it is known technique to calender the reinforcing cords with rubber to manufacture plies in which the cords are embedded in rubber, the calendering rubber compound is selected to achieve a specific function such as adherence of rubber to a steel cord, and or to give to the tire unique properties.

It is known that the compounds that bind the reinforcing cords to the layers that reinforce the tread region play a significant role in obtaining a high rigidity of the tread portion. The calendering rubber compound of the belt cross plies is designed to have a high elastic modulus. By contrast, the calendering rubber compounds for the carcass cords usually have a low elastic modulus because they need to withstand the high amounts of deformation they experience in the sidewalls of the tires.

Furthermore, there is an endless need to reduce the fuel consumption of vehicles. To this end, it is desired to design tires which have a very low rolling resistance while keeping the other performances unaffected, namely wear resistance, adherence, handling, etc. This also has an influence on the design of the rubber compounds and of the reinforcing layers of cords and their locations in the tire.

Therefore, even when reinforcing cords can be directly applied rather than by precalendering them and making a semi-finished ply before building the tire with said semi-finished ply, the designer of the tire is likely to use the same rubber compounds on a given side of the ply at every location in the tire.

SUMMARY OF THE INVENTION

An on-going goal of this invention is to lower the overall mass of the tire in an attempt to decrease the rolling resistance of the tire, while keeping at a valuable level other performances of the tire.

A further objective of the invention is to provide a tire structure which readily lends itself to mechanized manufacture.

In the following specification, the term "cord" is understood to mean both monofilaments and multifilaments, or assemblies such as ply cords, twisted cords, or alternatively any kind of equivalent assembly, this being irrespective of the material and treatment of these cords which may, for example, have a surface treatment or be coated or pre-coated with adhesive to promote them to stick to the rubber. The term "reinforcing layer" means cords arranged in parallel with respect to each other, generally characterized by the angle made by a cord at and with respect to the mid circumferential center plane CP perpendicular to the axis of the tire.

The term "compound" means a rubber mix having one or more base elastomer and additives selected in accordance with the properties of the compound desired for the zone of the tire it is used. "Contact" between a cord and a rubber mix or compound is understood to mean the fact that at least some of the external face of the cord is in close contact with said compound. The "elastic modulus" of a compound is understood to be a secant extension modulus obtained at a deformation in uniaxial extension of the order of 10% at room temperature.

The tire according to the invention comprises:
a tread,
at least one radially outermost reinforcing layer of belt reinforcement cords arranged substantially at a zero angle with respect to a mid circumferential center plane perpendicular to the axis of the tire,
a carcass having carcass cords and being located radially inwardly of the at least one radially outermost reinforcing layer of belt reinforcement textile cords, said carcass being anchored in each side of the tire in a bead,
an anchoring means for anchoring said carcass in the beads, and the tire further having, in a substantial portion of the axial width of said at least one radially outermost reinforcing layer, in any cross section perpendicular to the axis of the tire and intersecting a cord of said at least one radially outermost reinforcing layer:
a tread compound having direct contact with the radially outward side of the cords of said at least one radially outermost reinforcing layer, and
a first decoupling layer comprising a decoupling compound different than the tread compound, said decoupling compound having direct contact with the radially inner side of the cords of said at least one radially outermost reinforcing layer, the tread compound having contact with the decoupling compound in interfaces terminating axially on the cords of said at least one radially outermost reinforcing layer.

In other words, the invention proposes to apply a tread compound directly on the outermost layer of reinforcing cords, preferably on textile cords, without using any calendering rubber. The tire of the invention features the direct contact of tread compound on textile cords. In many embodiments the compound used radially inwardly of said textile cords will be different in nature, the tire in this particular case will also feature interfaces between the different compounds. The path of said interfaces goes from cord to cord in the radially outermost reinforcing layer of belt reinforcement textile cords.

The invention proposes a tire further having a first decoupling layer of a decoupling compound different than the tread compound, said decoupling compound being in direct contact with the radially inner side of the textile cords of the radially outermost reinforcing layer of belt reinforcing textile cords, the tread compound being in contact with the decoupling compound in interfaces terminating axially on the textile cords of the radially outermost reinforcing layer of belt reinforcement textile cords.

As the tire of the invention does not have any calendering rubber on a substantial portion of the axial width of said at least one radially outermost reinforcing layer of belt reinforcement textile cords. the thickness of the compound in direct contact with the radially outward side of the textile cords of said at least one radially outermost reinforcing layer of belt reinforcing textile cords (which is a tread compound), measured in a cross section perpendicular to the axis of the tire and radially above an outward side of one said textile cord, is greater than the usual thickness of calendering rubber layers. It has been referred to a substantial portion of the axial width of said at least one radially outermost reinforcing layer to notify to the skilled person that the direct contact of the tread compound as explained has a significant technical feature. That means that the direct contact occurs at least along continuous portions axially on several adjacent cords. For instance a direct contact on all the textile cords included in a portion of at least 5% of the total width of the radially outermost reinforcing layer of belt reinforcement textile cords is significant.

The "decoupling compound" used can be the same in several decoupling layers, as it will become apparent in the disclosure of a preferred embodiment of the invention. In said preferred embodiment, it is also apparent that the bead reinforcement is obtained with a radially oriented pile of circumferential cords bordering laterally the carcass, although the invention is not restricted to that particular way to embody the anchoring means for anchoring the carcass.

BRIEF DESCRIPTION OF THE FIGURES

The invention is now described by means of the appended drawing in which.

DETAILED DESCRIPTION OF THE PREFERRED EMBODIMENTS

Figure 1:
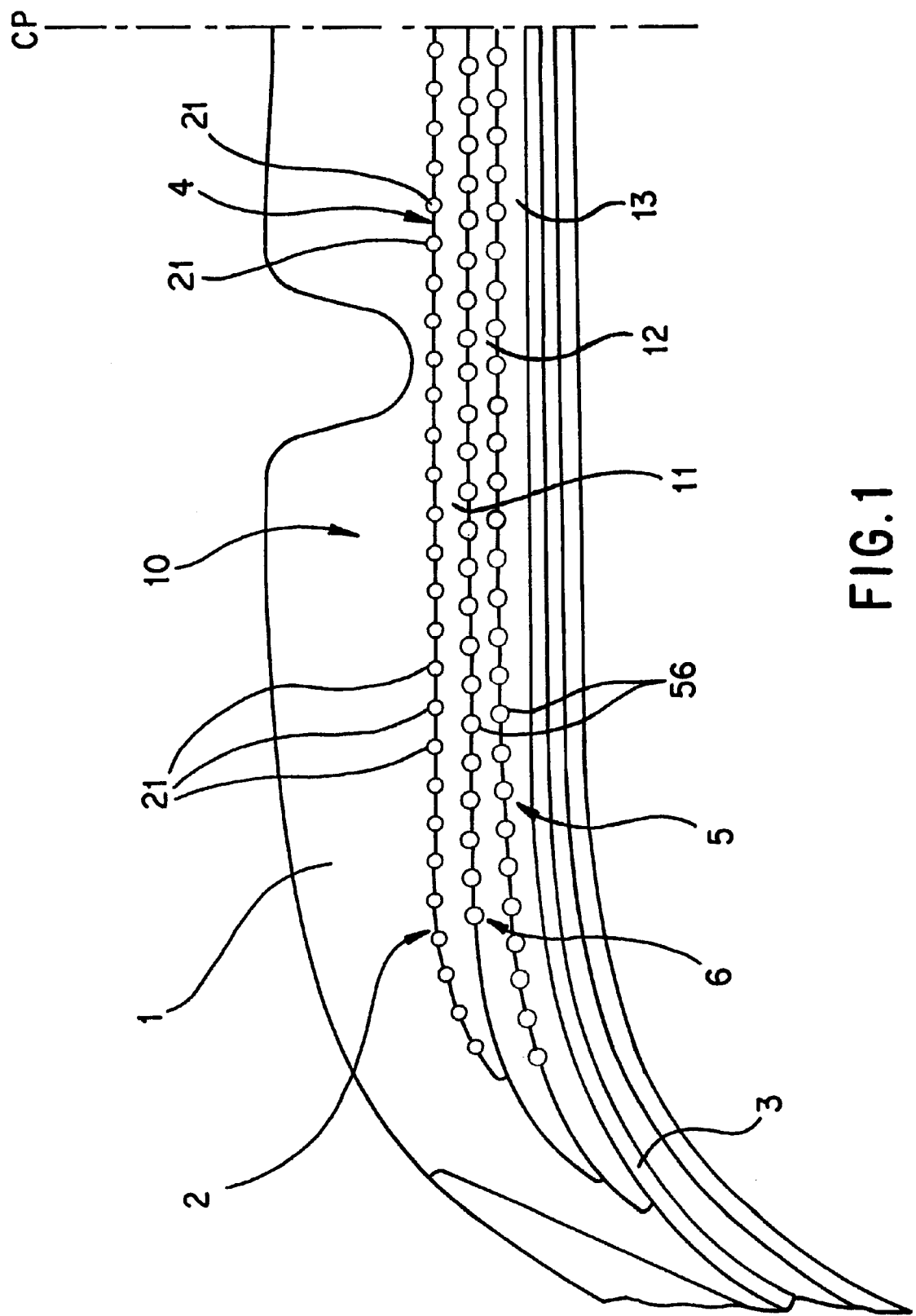
FIG. 1 is a partial cross section in a meridian plane of a tire according to the invention.

Depicted in FIG. 1 in partial cross section is the crown of a tire according to this invention. This crown comprises a tread 1 and a radially outermost reinforcing layer 2. The radially outermost layer 2 consists of belt reinforcement textile cords 21, arranged substantially at a zero angle with respect to the mid circumferential center plane CP perpendicular to the axis of the tire. In this particular embodiment, the textile cord 21 is a nylon cord spirally wound from one shoulder of the tire to the other, as clearly shown of FIG. 1. This implies that the textile cord has in fact a small non zero angle with respect to the center plane CP, in order that all the revolutions of the textile cord are adjacent.

The textile cord 21 could equally be a polyester one, an aramide one, or any hybrid cord base on the above cited textile cords or other equivalent textile cords, depending on the reinforcing effect that the tire designer selects. More generally, as the invention suggests to avoid the use of a specific rubber compound designed to calender the cords, the cords in the radially outermost reinforcing layer 2 are non metallic cords (i.e. textile cords). Textile cords, although being very often embedded in a calendering rubber, do not require the use of unique formulae of calendering rubber designed to allow adhesion of rubber on metallic cords.

Radially inwardly of the radially outermost reinforcing layer 2, the crown of the tire also comprises two radially superposed belt reinforcing layers 5, 6 of cords arranged at bias angles. In this particular embodiment, the same steel cord 56 is used in both belt reinforcing layers 5 and 6, although this feature obviously does not limit the scope of the invention. The cords 56 are arranged at a bias angle. As well known by persons having a working skill in the art, the direction of said angle typically is opposite in one belt reinforcing layer with respect to the other belt reinforcing layer. In other words, the angle in one belt reinforcing layer is positive and the angle in the other belt reinforcing layer is negative. As well known, the absolute value of said bias angle is in the range about of 10° to 75° with respect to the center plane CP. The absolute value of said angles is not necessarily identical in both plies but typically said angles have close to opposing values. The crown of the tire also has a carcass 3 having carcass cords, said carcass going further into the sidewalls and being anchored in the beads (not shown). In this particular embodiment, the carcass cord used is a polyester cord, but other cords, especially textile ones as aramide cords, glass fiber cords, rayon cords, polyester cords, or hybrid textile cords could be used, or even steel cords, namely in the case of heavy truck tires.

The tread 1 is made of a tread compound 10. The tread compound 10 is in direct contact with the radially outward side of the textile cords 21 of the at least one radially outermost reinforcing layer 2. The first decoupling layer 11 is made of a decoupling compound. The decoupling compound is in direct contact with the radially inner side of the cords 21 of the at least one radially outermost reinforcing layer 2. The tread compound also comes in contact with the decoupling compound of the first decoupling layer 11 in interfaces 4 located between the textile cords 21. For instance, as shown in FIG. 1, the interfaces 4 appearing axially between two adjacent textile cords 21 are substantially even with the center of said textile cords 21 of the radially outermost reinforcing layer 2. This particular radial position of the interfaces could be substantially different, i.e. radially slightly above the outermost face of the textile cords 21 or radially slightly inwardly of the innermost face of said textile cords 21.

Figure 3:
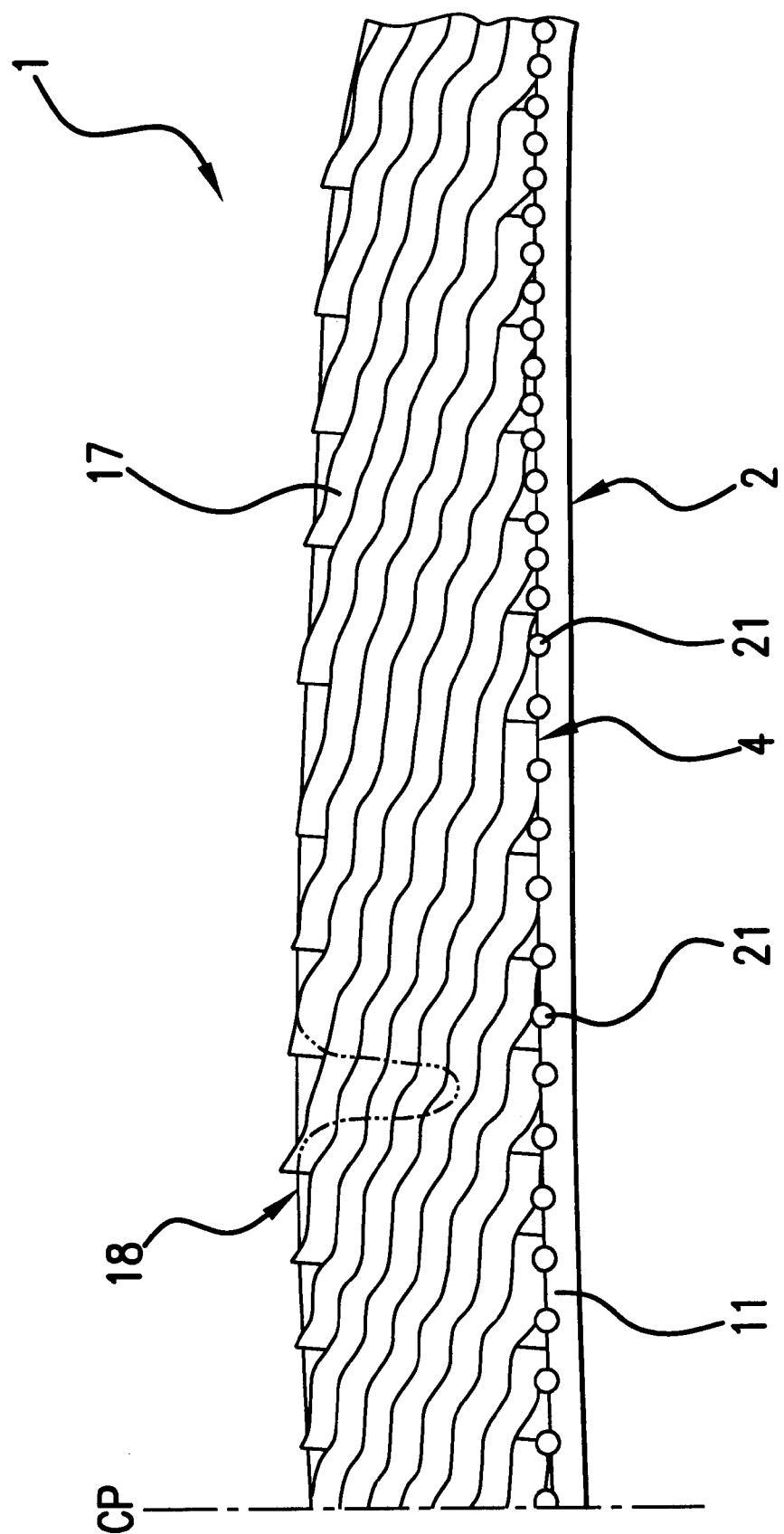
FIG. 3 is a partial cross section in a meridian plane of a tire before molding, according to the invention.

Advantageously, the tread compound is laid down by a strip winding technique: strips 17 (see FIG. 3) are wound continuously on said radially outermost reinforcing layer 2, as opposed to the use of a profiled semi-finished tread wound in one turn. Then the desired profile is imposed by the profile 18 of a mold during the vulcanization step. During the vulcanization step, all the voids which could possibly be left by the use of a strip winding technique, as shown schematically on FIG. 3 between the radially inward portion of the strips 17 and said radially outermost reinforcing layer 21 and said decoupling layer 11 shall disappear.

Also, it is advantageous to lay said at least one radially outermost reinforcing layer 21 down by winding a single cord 21 along the desired path, as opposed to the common technique of laying down a strip including a plurality of cords (e.g. 10 cords) embedded in parallel into calendering rubber, as shown for instance in U.S. Pat. No. 4,869,307. "Winding a single cord" means guiding individually one single cord to arrange the cord along the predefined path into the radially outermost reinforcing layer 21, and does not exclude that more than one cord is used to build up said radially outermost reinforcing layer, being intended that every cord is so individually guided when laid down. For instance, one individual cord 21 can be wound for the left portion of said radially outermost reinforcing layer 21, and another individual cord 21 can be wound for the right portion of said radially outermost reinforcing layer 21. Also, for instance, two individual cords 21 can be wound starting in the left shoulder region and ending in the right shoulder region, both being individually guided during the laying down process.

The tread compound 10 and the decoupling compound of the decoupling layer 11 are very different in nature, so that the interface between the two compounds appears very clearly as shown on the drawing. In passenger cars tires, typically, the decoupling compound is a rubber mix whose base elastomer is natural rubber, or at least contains principally natural rubber as base elastomer. The elastic modulus of the decoupling compound is in the range of 2.5 to 30 MPa, and more typically in the range of 5 to 30 MPa. The tread compound is a rubber mix which contains 100% of the total weight of elastomer of Synthetic Rubber (SBR [Styrene Butadiene Rubber] or PB [Polybutadiene]) or a blend of more than 60% and preferably at least 70% of the total weight of elastomer of Synthetic Rubber and Natural Rubber (NR). The elastic modulus of the tread compound has an elastic modulus between 2.5 and 7.5 MPa. The tread can be made of more than one rubber mix, in different axial region of the tread and or in different position within the thickness of the tread. For instance, one can use a first rubber mix in the shoulder parts of the tread, and another rubber mix in the middle part.

Figure 2:
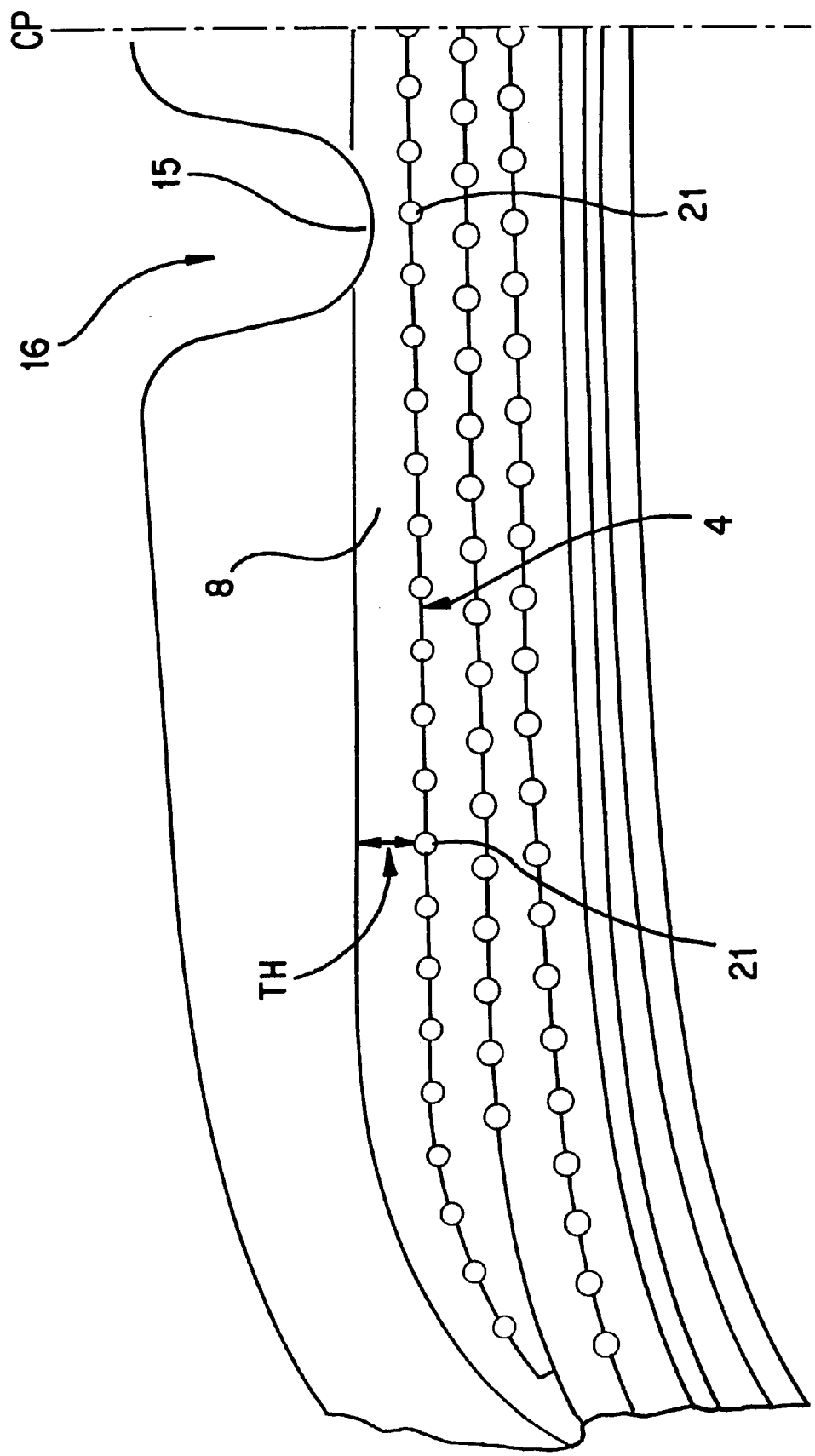
FIG. 2 is an enlarged view of a partial cross section in a meridian plane of a tire according to a variation of the invention.

As another example of possible variations, one can also use more than one rubber mix superposed radially in the tread. For example, one can have a rubber mix called "subtread" 8 (layer of rubber compound under the tread—see FIG. 2) in the portion designed to keep a minimum thickness of rubber between the bottom 15 of grooves 16 appearing in the tread design and the radially outward side of the textile cords 21 of the radially outermost reinforcing layer 2. Said rubber mix can be selected to fulfill the following possible advantages: reduced rolling resistance, reduced cost, improved handling, avoiding belt separation in the shoulder area by reducing the heat build up through the use of lower hysteresis rubber mixes. In the present specification, the word "tread compound" shall be construed as also covering a subtread 8. In such an embodiment, the tire tread typically comprises at least a first tread compound having an elastic modulus between 2.5 and 7.5 MPa and a subtread compound which is in direct contact with the radially outward side of said textile cords and having an elastic modulus between 5 and 50 MPa.

Such a subtread plays an entirely different role than a calendering rubber referred to hereabove, and said subtread, as any tread compound of the tread, has a greater thickness than a calendering rubber. Consequently, and more generally, the thickness TH of the tread compound in direct contact with the radially outward side of the textile cords of said at least one radially outermost reinforcing layer of belt reinforcing textile cords, measured in a cross section perpendicular to the axis of the tire and radially above an outward side of one said textile cord, is greater than 1 mm, and preferably greater than 2 mm.

The invention proposes a design which simplifies as much as possible the manufacturing of the tire, due to a decrease of the number of layers superposed radially, while maintaining good tire performances.

The tire has a second decoupling layer 12 made of a decoupling compound, interposed between the two radially superposed belt reinforcing layers 5 and 6. The decoupling compound of the second decoupling layer 12 is in direct contact with the radially inner side of the steel cords 56 of the radially upper belt reinforcing layer 6 and is in direct contact with the radially outer side of the cords of the radially inner belt reinforcing layer 5.

The tire has a third decoupling layer 13 made of a decoupling compound, interposed between the innermost belt reinforcing layer 5 and the carcass 3. In this particular preferred embodiment, the decoupling compound of the third decoupling layer is in direct contact with the radially inner side of the cords 56 of the radially innermost belt reinforcing layer 5 and is in direct contact with the radially outer side of the cords of the carcass 3, according to the description in U.S. Pat. No. 6,199,612, incorporated herewith by this reference.

In a non-limiting embodiment, the third decoupling layer has just one layer of compound that is between the carcass reinforcement and the first belt reinforcing layer, wherein the one layer of compound is in contact radially with a second layer of compound beyond the crown, in a sidewall region. The second layer of compound having a different modulus of elasticity than the first. The separation occurs at the end of the crown reinforcing ply with a possibility, as appropriate, for this limit to be offset axially either toward the outside or toward the inside.

For the different decoupling layers 11, 12 and 13, it is suggested to use the same decoupling compound having an elastic modulus on the range of 6 to 12 MPa.

The tire according to the invention may comprise a single carcass 3 consisting of one circumferential row of reinforcing cords anchored in the two beads of the tire, in which case the carcass-reinforcing cords are in contact radially on the outside with the third decoupling layer of decoupling compound, as has been described. The tire may also comprise a carcass composed of a greater number of circumferential rows of reinforcing cords anchored in the two beads. In this case of course only the reinforcing cords belonging to the circumferential row which is radially furthest toward the outside of the tire are in contact with the third decoupling layer.

Turning to the anchoring means, in the embodiment shown, each axial coordinate defining the profile of carcass 3 has a unique radial position for each radial position in the beads. At its radially inwardmost extent, carcass 3 may terminate in the bead portion without being turned up around a bead core, as shown in U.S. Pat. No. 5,660,656. Referring for instance to FIG. 4 of said U.S. Pat. No. 5,660,656, the carcass 3 is anchored in bead portion by at least one spirally wound circumferentially oriented cord (see 52) laterally bordering the carcass 3 on at least one side axially. In this instance "anchored" in the bead portion means that cords (in FIG. 4, in both sides, a second spirally wound circumferentially oriented cord 51 bordering the cords of the carcass on the other side in axial direction) resist the tension developed in carcass 3 due to inflating pressure solely by the adherence of the carcass cord.

As far as manufacture is concerned, although different processes can be used, it is advantageous to build the tire on a rigid inner core that imposes the shape of the internal cavity. All the constituent parts of the tire are laid down onto this core in the order required by the final design, these components being placed directly in their final position without requiring any shaping at any time in the construction. This construction may use the devices described in U.S. Pat. No. 4,804,436 or 5,261,795. The tire can be molded and vulcanized as explained in U.S. Pat. Nos. 4,895,692 or 5,639,326, the references in this section being made of course for illustrative purposes only.

The invention suggests to place in direct contact the tread compound on the radially outermost reinforcing layer of belt reinforcement textile cords, but does not preclude the use of more than one compound in the tread, or the use of an evolutionary compound in the tread. Although described in relation with a passenger car tire, the invention is not limited to any particular use and could be used for truck tires or other tires.

The invention proposes a very simple way to achieve a good compromise between ever conflicting performance features such as belt separation, rolling resistance, handling characteristics, and cost of manufacture.

We claim:

1. A tire comprising:
   a tread,
   a radially outermost reinforcing layer of belt reinforcement cords arranged substantially at a zero angle with respect to a mid circumferential center plane perpendicular to the axis of the tire, said radially outermost reinforcing layer having an axial width, said belt reinforcement cords having a radially outward side of the cords and a radially inner side of the cords,
   a carcass having carcass cords and being located radially inwardly of the radially outermost reinforcing layer of belt reinforcement cords, said carcass being anchored in each side of the tire in a bead,
   an anchoring means for anchoring said carcass in the beads,
   and the tire further having, in a substantial portion of the axial width of said radially outermost reinforcing layer, in any cross section perpendicular to the axis of the tire and intersecting a cord of said radially outermost reinforcing layer:
   a tread compound having direct contact with the radially outward side of the cords of said radially outermost reinforcing layer, and
   a first decoupling layer comprising a decoupling compound different in composition than the tread compound, said decoupling compound having direct contact with the radially inner side of the cords of said radially outermost reinforcing layer, the tread compound having contact with the decoupling compound in interfaces terminating axially on the cords of said radially outermost reinforcing layer,
   wherein said tread compound has an elastic secant modulus at 10% elongation between 2.5 and 7.5 MPa.

2. A tire according to claim 1, wherein the thickness of the tread compound in direct contact with the radially outward side of the cords of said radially outermost reinforcing layer, measured in a cross section perpendicular to the axis of the tire and radially above an outward side of one of the cords, is more than 1 mm.

3. A tire according to claim 2, in which said direct contact involves all the cords included in a portion of at least 5% of the total width of said radially outermost reinforcing layer.

4. A tire according to claim 1, wherein the cords of said radially outermost reinforcing layer are textile cords.

5. A tire according to claim 1, wherein the cords of said radially outermost reinforcing layer are selected from the group consisting of nylon cords, polyester cords, fiber glass cords, aramide cords, and hybrid cords based thereon.

6. A tire according to claim 1, wherein the tread compound is laid down in strips wound on said radially outermost reinforcing layer.

7. A tire according to claim 1, wherein said radially outermost reinforcing layer is laid down by winding a single cord individually guided along a desired path.

8. A tire according to claim 1, further comprising, radially inwardly of said radially outermost reinforcing layer, at least two radially superposed belt reinforcing layers of cords arranged at bias angles, said angles being in one direction in one belt reinforcing layer and in the opposite direction in the other belt reinforcing layer, the absolute value of said bias angles being in the range of about 10° to 75°, the tire further having a second decoupling layer of a decoupling compound interposed between said at least two radially superposed belt reinforcing layers of cords arranged at bias angles, the decoupling compound of the second decoupling layer being in direct contact with the radially inner side of the cords of the radially upper belt reinforcing layer of cords arranged at bias angles and being in direct contact with the radially outer side of the cords of the radially inner belt reinforcing layer of cords arranged at bias angles.

9. A tire according to claim 1, wherein said tread compound is a rubber mix which contains a blend of Natural Rubber and more than 60% of Synthetic Rubber, percentage being in total weight of elastomer.

10. A tire according to claim 1, wherein said tread compound is a rubber mix which contains a blend of Natural Rubber and at least 70% of Synthetic Rubber, percentage being in total weight of elastomer.

11. A tire according to claim 1, wherein said tread compound is a rubber mix which contains 100% of the total weight of elastomer of Synthetic Rubber.

12. A tire according to claim 1 wherein each axial coordinate defining the profile of the carcass has a corresponding unique radial coordinate for each radial position in the beads, and the anchoring means comprises at least one spirally wound circumferentially oriented cord axially bordering the cords of the carcass on at least one side in the axial direction, said at least one spirally wound circumferentially oriented cord taking up the tension developed in the carcass by the inflation pressure solely by the adherence of the carcass laterally with the anchoring reinforcement.

13. A tire according to claim 12, wherein said anchoring means further comprises at least a second spirally wound circumferentially oriented cord axially bordering the cords of the carcass on the other side in the axial direction.

14. A tire comprising:
    a tread,
    a radially outermost reinforcing layer of belt reinforcement cords arranged substantially at a zero angle with respect to a mid circumferential center plane perpendicular to the axis of the tire, said radially outermost reinforcing layer having an axial width, said belt reinforcement cords having a radially outward side of the cords and a radially inner side of the cords,
    a carcass having carcass cords and being located radially inwardly of the radially outermost reinforcing layer of belt reinforcement cords, said carcass being anchored in each side of the tire in a bead by means of at least one spirally wound circumferentially oriented cord laterally bordering said carcass on at least one side axially in the beads,
    and the tire further having, in a substantial portion of the axial width of said radially outermost reinforcing layer, in any cross section perpendicular to the axis of the tire and intersecting a cord of said radially outermost reinforcing layer:
    a tread compound having direct contact with the radially outward side of the cords of said radially outermost reinforcing layer, and
    a first decoupling layer comprising a decoupling compound different in composition than the tread compound, said decoupling compound having direct contact with the radially inner side of the cords of said radially outermost reinforcing layer, the tread compound having contact with the decoupling compound in interfaces terminating axially on the cords of said radially outermost reinforcing layer, wherein said tread compound has an elastic secant modulus at 10% elongation between 2.5 and 7.5 MPa.

15. A tire according to claim 14, wherein the thickness of the tread compound in direct contact with the radially outward side of the cords of said radially outermost reinforcing layer, measured in a cross section perpendicular to the axis of the tire and radially above an outward side of one of the cords, is more than 1 mm.

16. A tire according to claim 15, in which said direct contact involves all the cords included in a portion of at least 5% of the total width of said radially outermost reinforcing layer.

17. A tire according to claim 14, wherein the cords of said radially outermost reinforcing layer are textile cords.

18. A tire according to claim 14, wherein the cords of said radially outermost reinforcing layer are selected from the group consisting of nylon cords, polyester cords, fiber glass cords, aramide cords, and hybrid cords based thereon.

19. A tire according to claim 14 wherein the tread compound is laid down in strips wound on said radially outermost reinforcing layer.

20. A tire according to claim 14, wherein said radially outermost reinforcing layer is laid down by winding a single cord individually guided along a desired path.

21. A tire according to claim 14 further comprising, radially inwardly of said radially outermost reinforcing layer, at least two radially superposed belt reinforcing layers of cords arranged at bias angles, said angles being in one direction in one belt reinforcing layer and in the opposite direction in the other belt reinforcing layer, the absolute value of said bias angles being in the range of about 10° to 75°, the tire further having a second decoupling layer of a decoupling compound interposed between said at least two radially superposed belt reinforcing layers of cords arranged at bias angles, the decoupling compound of the second decoupling layer being in direct contact with the radially inner side of the cords of the radially upper belt reinforcing layer of cords arranged at bias angles and being in direct contact with the radially outer side of the cords of the radially inner belt reinforcing layer of cords arranged at bias angles.

22. A tire according to claim 14, wherein said tread compound is a rubber mix which contains a blend of Natural Rubber and more than 60% of Synthetic Rubber, percentage being in total weight of elastomer.

23. A tire according to claim 14, wherein said tread compound is a rubber mix which contains a blend of Natural Rubber and at least 70% of Synthetic Rubber, percentage being in total weight of elastomer.

24. A tire according to claim 14, wherein said tread compound is a rubber mix which contains 100% of the total weight of elastomer of Synthetic Rubber.

25. A tire according to claim 14 wherein each axial coordinate defining the profile of the carcass has a corresponding unique radial coordinate for each radial position in the beads.

26. A tire according to claim 25, wherein said anchoring means further comprises at least a second spirally wound circumferentially oriented cord axially bordering the cords of the carcass on the other side in the axial direction.

27. A tire comprising:

a tread, a radially outermost reinforcing layer of belt reinforcement cords arranged substantially at a zero angle with respect to a mid circumferential center plane perpendicular to the axis of the tire, said radially outermost reinforcing layer having an axial width, said belt reinforcement cords having a radially outward side of the cords and a radially inner side of the cords, a carcass having carcass cords and being located radially inwardly of the radially outermost reinforcing layer of belt reinforcement cords, said carcass being anchored in each side of the tire in a bead an anchoring means for anchoring said carcass in the beads, and the tire further having, in a substantial portion of the axial width of raid radially outermost reinforcing layer, in any cross section perpendicular to the axis of the tire and intersecting a cord of said radially outermost reinforcing layer:

a tread compound having direct contact with the radially outward side of the cords of said radially outermost reinforcing layer, and a first decoupling layer comprising a decoupling compound different in composition than the tread compound, said decoupling compound having direct contact with the radially inner side of the cords of said radially outermost reinforcing layer, the tread compound having contact with the decoupling compound in interfaces terminating axially on the cords of said radially outermost reinforcing layer, wherein said tread comprises a first tread compound having an elastic secant modulus at 10% elongation between 2.5 and 7.5 MPa, and a subtread compound which is in direct contact with the radially outward side of said cords and having an elastic secant modulus at 10% elongation between 5 and 50 MPa.

28. A tire comprising:

a tread, a radially outermost reinforcing layer of belt reinforcement cords arranged substantially at a zero angle with respect to a mid circumferential center plane perpendicular to the axis of the tire, said radially outermost reinforcing layer having an axial width, said belt reinforcement cords having a radially outward side of the cords and a radially inner side of the cords, a carcass having carcass cords and being located radially inwardly of the radially outermost reinforcing layer of belt reinforcement cords, said carcass being anchored in each side of the tire in a bead by means of at least one spirally wound circumferentially oriented cord laterally bordering said carcass on at least one side axially in the beads, and the tire further having, in a substantial portion of the axial width of said radially outermost reinforcing layer, in any cross section perpendicular to the axis of the tire and intersecting a cord of said radially outermost reinforcing layer:

a tread compound having direct contact with the radially outward side of the cords of said radially outermost reinforcing layer, and a first decoupling layer comprising a decoupling compound different in composition than the tread compound, said decoupling compound having direct contact with the radially inner side of the cords of said radially outermost reinforcing layer, the tread compound having contact with the decoupling compound in interfaces terminating axially on the cords of said radially outermost reinforcing layer,
wherein said tread comprises a first tread compound having an elastic secant modulus at 10% elongation between 2.5 and 7.5 MPa, and a subtread compound which is in direct contact with the radially outward side of said cords and having an elastic secant modulus at 10% elongation between 5 and 50 MPa.

* * * * *

UNITED STATES PATENT AND TRADEMARK OFFICE
CERTIFICATE OF CORRECTION

PATENT NO. : 6,460,585 B1
DATED : October 8, 2002
INVENTOR(S) : Osborne et al.

It is certified that error appears in the above-identified patent and that said Letters Patent is hereby corrected as shown below:

Title page,
Item [75], Inventor(s), "Bernad" should read -- Bernard --
Item [57], ABSTRACT,
Line 1, "tread" should read -- tread, --; and "radialIy" should read -- radially --
Line 3, "mid circum-" should read -- mid-circum- --
Line 5, "carcass" should read -- carcass, and --

Column 1,
Line 31, "and" should read -- and/ --
Line 58, "on-going" should read -- ongoing --

Column 2,
Line 8, "mid" should read -- mid- --
Line 12, "elastomer" should read -- elastomers --
Line 25, "mid circumferential" should read -- mid-circumferential --

Column 3,
Line 6, "cords." should read -- cords, --
Line 49, "mid circumferential" should read -- mid-circumferential --
Line 53, "non zero" should read -- non-zero --
Line 64, "non metallic" should read -- non-metallic --

Column 4,
Line 13, "about of" should read -- of about --
Line 58, "10" should read -- 10 -- (no bold)

Column 5,
Line 31, "8" should read -- 8 -- (boldface)
Line 41, "specification,the" should read -- specification, the --
Line 49, "hereabove" should read -- hereinabove --

Column 6,
Line 42, "inwardmost" should read -- innermost --

Column 7,
Line 17, "mid circumferential" should read -- mid-circumferential --

UNITED STATES PATENT AND TRADEMARK OFFICE
CERTIFICATE OF CORRECTION

PATENT NO. : 6,460,585 B1
DATED : October 8, 2002
INVENTOR(S) : Osborne et al.

It is certified that error appears in the above-identified patent and that said Letters Patent is hereby corrected as shown below:

Column 8,
Line 43, "mid circumferential" should read -- mid-circumferential --

Column 9,
Line 24, "fiber glass" should read -- fiberglass --

Column 10,
Line 5, "mid circumferential" should read -- mid-circumferential --
Line 13, "bead" should read -- bead, --
Line 43, "mid circumferential" should read -- mid-circumferential --
Line 51, "at" should read -- ¶at --

Signed and Sealed this

Fourteenth Day of October, 2003

JAMES E. ROGAN
*Director of the United States Patent and Trademark Office*